(12) United States Patent
Guo et al.

(10) Patent No.: US 11,327,756 B2
(45) Date of Patent: May 10, 2022

(54) METHODS AND PROCESSORS FOR PERFORMING RESOURCE DEDUCTION FOR EXECUTION OF SMART CONTRACT

(71) Applicant: ALIPAY (HANGZHOU) INFORMATION TECHNOLOGY CO., LTD., Zhejiang (CN)

(72) Inventors: Xuepeng Guo, Hangzhou (CN); Kuan Zhao, Hangzhou (CN); Ren Guo, Hangzhou (CN); Yubo Guo, Hangzhou (CN); Haiyuan Gao, Hangzhou (CN); Qibin Ren, Hangzhou (CN); Zucheng Huang, Hangzhou (CN); Lei Zhang, Hangzhou (CN); Guozhen Pan, Hangzhou (CN); Changzheng Wei, Hangzhou (CN); Zhijian Chen, Hangzhou (CN); Ying Yan, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,855

(22) Filed: Jun. 29, 2021

(65) Prior Publication Data
US 2021/0326132 A1 Oct. 21, 2021

(30) Foreign Application Priority Data

Jul. 23, 2020 (CN) .......................... 202010713739.2

(51) Int. Cl.
*G06F 9/30* (2018.01)
*G06F 9/38* (2018.01)
(Continued)

(52) U.S. Cl.
CPC ........ *G06F 9/3012* (2013.01); *G06F 9/30145* (2013.01); *G06F 9/3891* (2013.01);
(Continued)

(58) Field of Classification Search
None
See application file for complete search history.

(56) References Cited

U.S. PATENT DOCUMENTS 5,991,874 A * 11/1999 Mills ................... G06F 9/30021
712/200
8,266,629 B2 * 9/2012 Inoue .................. G06F 9/45558
718/108
(Continued)

FOREIGN PATENT DOCUMENTS

CN 102567200 7/2012
CN 110399184 11/2019
(Continued)

OTHER PUBLICATIONS

Barry Watson's 'Adder/Subtractor' from barrywatson.se, copyright 2014. (Year: 2014).*

(Continued)

*Primary Examiner* — Steven G Snyder
(74) *Attorney, Agent, or Firm* — Fish & Richardson P.C.

(57) ABSTRACT

A first logic circuit included in a processor receives a first digital signal, where the first logic circuit includes a special purpose register, a comparator, and an adder, where the special purpose register stores a first resource balance for executing a smart contract, where the first digital signal includes a resource deduction quota corresponding to a code set in the smart contract. The first logic circuit reads the first resource balance from the special purpose register. The first logic circuit compares, using the comparator, the first resource balance with the resource deduction quota. In response to the first resource balance being greater than or equal to the resource deduction quota, the first logic circuit subtracts, using the adder, the resource deduction quota from the first resource balance to obtain a second resource bal- (Continued)

ance. The first logic circuit stores the second resource balance in the special purpose register.

20 Claims, 5 Drawing Sheets

(51) Int. Cl.
*G06F 9/50* (2006.01)
*G06F 9/455* (2018.01)
*G06Q 20/02* (2012.01)
*G06Q 20/30* (2012.01)

(52) U.S. Cl.
CPC ........ *G06F 9/45558* (2013.01); *G06F 9/5055* (2013.01); *G06Q 20/02* (2013.01); *G06Q 20/30* (2013.01); *G06F 2009/4557* (2013.01); *G06F 2009/45583* (2013.01)

(56) References Cited

U.S. PATENT DOCUMENTS

| | | | |
|---|---|---|---|
| 8,484,392 B2 * | 7/2013 | Manula | G06F 9/5077 710/56 |
| 8,677,353 B2 * | 3/2014 | Machida | G06F 9/5077 718/1 |
| 9,424,072 B2 * | 8/2016 | Busaba | G06F 9/5044 |
| 10,924,363 B2 * | 2/2021 | Pan | G06Q 20/308 |
| 2017/0017525 A1 | 1/2017 | Gupta et al. | |
| 2017/0353309 A1 | 12/2017 | Gray | |
| 2019/0149550 A1 | 5/2019 | Brakeville et al. | |
| 2020/0004737 A1 | 1/2020 | Qiu | |
| 2021/0266328 A1 * | 8/2021 | Sharma | H04L 63/108 |
| 2021/0357260 A1 * | 11/2021 | Vijapur | G06F 9/5011 |

FOREIGN PATENT DOCUMENTS

| | | | |
|---|---|---|---|
| CN | 110704368 | 1/2020 | |
| CN | 111381938 | 7/2020 | |
| EP | 3386142 | 10/2018 | |
| JP | 2016219014 A * | 12/2016 | ............. G06Q 20/42 |
| JP | 2018535500 A * | 5/2018 | ............. G06Q 40/00 |
| JP | 6818034 B2 * | 1/2021 | ............. G06Q 40/00 |
| JP | 6858493 B2 * | 4/2021 | ........... G06Q 20/401 |

OTHER PUBLICATIONS

'CS510: Computer Architectures' Fall, 2001, Jung Wan Cho. (Year: 2001).*
'Atomic Shared Register Access by Asynchronous Hardware' by Paul M.B. Vitanyi et al., copyright 1986, IEEE. (Year: 1986).*
'What is Gas Fee?' from etherscan.com, 2019 ('updated 2 years ago'). (Year: 2019).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in European Appln. No. 21181715. 0, dated Jan. 4, 2022, 10 pages.

* cited by examiner

METHODS AND PROCESSORS FOR PERFORMING RESOURCE DEDUCTION FOR EXECUTION OF SMART CONTRACT

CROSS-REFERENCE TO RELATED APPLICATIONS

This application claims priority to Chinese Patent Application No. 202010713739.2, filed on Jul. 23, 2020, which is hereby incorporated by reference in its entirety.

TECHNICAL FIELD

Embodiments of the present specification relate to the field of blockchain technologies, and more specifically, to methods, processors, computing devices, and computer digital signals for performing resource deduction for execution of a smart contract.

BACKGROUND

In a blockchain, before a smart contract is executed in a virtual machine, a predetermined amount of energy (GAS) usually needs to be deducted from a corresponding account as a cost for performing a predetermined operation. Currently, when performing GAS deduction for a basic block that includes one or more instructions in a smart contract, a basic procedure includes: determining whether a balance of GAS allocated to the smart contract is greater than or equal to a GAS consumption value of the basic block determined during compilation; and if the balance is greater than or equal to the GAS consumption value, performing GAS deduction corresponding to the basic block, and then executing all instructions in the basic block; or if the balance is less than the GAS consumption value, terminating execution of the smart contract. However, in the existing technology, the previous GAS deduction operation is performed by using a plurality of general purpose instructions of a processor, and in the process of executing the smart contract, the GAS deduction is a hot operation (that is, a frequently performed operation). Therefore, the use of the plurality of general purpose instructions to perform the GAS deduction operation affects execution efficiency of the smart contract.

Therefore, a more effective solution to performing resource deduction for execution of a smart contract is needed.

SUMMARY

Embodiments of the present specification intend to provide a more effective solution to performing resource deduction for execution of a smart contract, to alleviate disadvantages of the existing technology.

To achieve the objective, one aspect of the present specification provides a method for performing resource deduction for execution of a smart contract, where the method is performed by a processor, the processor includes a special purpose register, the special purpose register stores a first resource balance for executing the smart contract, and the method includes the following:

A first extended instruction is read, where the first extended instruction includes a resource deduction quota amount corresponding to a predetermined code set, and the following operations are performed based on the first extended instruction:

The first resource balance is read from the special purpose register; the first resource balance is compared with the resource deduction quota; if the comparison result is that the first resource balance is greater than or equal to the resource deduction quota, the resource deduction quota is subtracted from the first resource balance to obtain a second resource balance; and the second resource balance is stored in the special purpose register.

In an implementation, the processor further includes a first general purpose register, the first general purpose register stores, before the smart contract is executed, a third resource balance for executing the smart contract, and the method further includes the following:

Before the smart contract is executed, a second extended instruction is read, where the second extended instruction includes an identifier of the first general purpose register; the third resource balance is read from the first general purpose register; and the third resource balance is stored in the special purpose register.

In an implementation, the processor further includes a second general purpose register, and the method further includes the following:

After the smart contract is executed, a third extended instruction is read, where the third extended instruction includes an identifier of the second general purpose register; a current fourth resource balance is read from the special purpose register; and the fourth resource balance is stored in the second general purpose register.

In an implementation, the processor further includes a status register, and the method further includes the following: If the comparison result is that the first resource balance is less than the resource deduction quota, execution of the smart contract is terminated, and a state of balance insufficiency is recorded in the status register.

In an implementation, the first extended instruction is read, including: reading the first extended instruction before executing the predetermined code set in the smart contract.

Another aspect of the present specification provides a method for performing resource deduction for execution of a smart contract, where the method is performed by a processor in a computing device, the computing device includes a first storage unit, the first storage unit stores a first resource balance for executing the smart contract, and the method includes the following:

A fourth extended instruction is read, where the fourth extended instruction includes an identifier of the first storage unit and a resource deduction quota corresponding to a predetermined code set, and the following operations are performed based on the fourth extended instruction:

The first resource balance is read from the first storage unit; the first resource balance is compared with the resource deduction quota; if the comparison result is that the first resource balance is greater than or equal to the resource deduction quota, the resource deduction quota is subtracted from the first resource balance to obtain a second resource balance; and the second resource balance is stored in the first storage unit.

In an implementation, the first storage unit is a first general purpose register included in the processor.

In an implementation, the first storage unit is a first memory address in the computing device.

Another aspect of the present specification provides a processor, including a first logic circuit, where the first logic circuit includes: a special purpose register configured to store a first resource balance for executing a smart contract; and a comparator and an adder, where the first logic circuit is configured to perform the following operations after receiving a first digital signal, where the first digital signal includes a resource deduction quota corresponding to a predetermined code set in the smart contract:

The first resource balance is read from the special purpose register; the first resource balance is compared with the resource deduction quota by using the comparator; if the comparison result is that the first resource balance is greater than or equal to the resource deduction quota, the resource deduction quota is subtracted from the first resource balance by using the adder, to obtain a second resource balance; and the second resource balance is stored in the special purpose register.

In an implementation, the processor further includes a second logic circuit, the second logic circuit includes a first general purpose register and the special purpose register, the first general purpose register is configured to store, before the smart contract is executed, a third resource balance for executing the smart contract, and the second logic circuit is configured to perform the following operations after receiving a second digital signal, where the second digital signal includes an identifier of the first general purpose register:

The third resource balance is read from the first general purpose register; and the third resource balance is stored in the special purpose register.

In an implementation, the processor further includes a third logic circuit, the third logic circuit includes a second general purpose register and the special purpose register, and the third logic circuit is configured to perform the following operations after receiving a third digital signal, where the third digital signal includes an identifier of the second general purpose register: a current fourth resource balance is read from the special purpose register; and the fourth resource balance is stored in the second general purpose register.

In an implementation, the first logic circuit further includes a status register, and the first logic circuit is further configured to terminate execution of the smart contract and record a state of balance insufficiency in the status register if the comparison result is that the first resource balance is less than the resource deduction quota.

Another aspect of the present specification provides a processor, including a fourth logic circuit, where the fourth logic circuit includes: a first general purpose register configured to store a first resource balance for executing a smart contract; and a comparator and an adder, where the fourth logic circuit is configured to perform the following operations after receiving a fourth digital signal, where the fourth digital signal includes an identifier of the first general purpose register and a resource deduction quota corresponding to a predetermined code set in the smart contract:

The first resource balance is read from the first general purpose register; the first resource balance is compared with the resource deduction quota by using the comparator; if the comparison result is that the first resource balance is greater than or equal to the resource deduction quota, the resource deduction quota is subtracted from the first resource balance by using the adder, to obtain a second resource balance; and the second resource balance is stored in the first general purpose register.

Another aspect of the present specification provides a processor, including a fifth logic circuit, where the fifth logic circuit includes a comparator and an adder, where the fifth logic circuit is configured to perform the following operations after receiving a fifth digital signal, where the fifth digital signal includes a first memory address and a resource deduction quota corresponding to a predetermined code set in a smart contract, and the first memory address is configured to store a first resource balance for executing the smart contract: the first resource balance is read from the first memory address; the first resource balance is compared with the resource deduction quota by using the comparator; if the comparison result is that the first resource balance is greater than or equal to the resource deduction quota, the resource deduction quota is subtracted from the first resource balance by using the adder, to obtain a second resource balance; and the second resource balance is stored in the first memory address.

Another aspect of the present specification provides a computing device, including any one of the aforementioned processors.

Another aspect of the present specification provides a computer digital signal, including a resource deduction quota corresponding to a predetermined code set in a smart contract, where the computer digital signal is used to indicate use of the aforementioned first logic circuit.

Another aspect of the present specification provides a computer digital signal, including an identifier of a first general purpose register in a processor, where the computer digital signal is used to indicate use of the aforementioned second logic circuit.

Another aspect of the present specification provides a computer digital signal, including an identifier of a second general purpose register in a processor, where the computer digital signal is used to indicate use of the aforementioned third logic circuit.

Another aspect of the present specification provides a computer digital signal, including an identifier of a first general purpose register in a processor and a resource deduction quota corresponding to a predetermined code set in a smart contract, where the computer digital signal is used to indicate use of the aforementioned fourth logic circuit.

Another aspect of the present specification provides a computer digital signal, including a first memory address in a processor and a resource deduction quota corresponding to a predetermined code set in a smart contract, where the computer digital signal is used to indicate use of the previous fifth logic circuit.

Another aspect of the present specification provides a computer-readable storage medium, where the computer-readable storage medium stores a computer program, and when the computer program is executed in a computer, the computer is enabled to perform any one of the previous methods.

Another aspect of the present specification provides a computing device, including a memory and a processor, where the memory stores executable code, and when the processor executes the executable code, any one of the previous methods is implemented.

According to the smart contract execution solutions in the embodiments of the present specification, the deduction operation is performed for the smart contract by using the extended instruction based on the processor and the processor reconstructed based on the extended instruction. As such, the hot operation is completed more efficiently, the execution of the smart contract is accelerated, and execution efficiency of a virtual machine is improved. Embodiments of the present disclosure may be applicable to blockchain integrated stations.

BRIEF DESCRIPTION OF DRAWINGS

The embodiments of the present specification are described with reference to the accompanying drawings, which can make the embodiments of the present specification clearer.

DESCRIPTION OF EMBODIMENTS

Embodiments of the present specification are described below with reference to the accompanying drawings.

A transaction for creating a smart contract is sent to a blockchain node to deploy the smart contract on the blockchain. After the blockchain node performs consensus on the transaction, a virtual machine (such as an EVM or a WASM virtual machine) of the blockchain node can execute the transaction, thereby creating a contract account corresponding to the smart contract. A specific address is allocated to the contract, and the contract code and account status are stored in an account storage (Storage) used to store account information. Subsequently, the blockchain node can receive a transaction for invoking the deployed smart contract (for example, a transaction 1). The transaction 1 can include the address of the contract to be invoked, and a function and input parameters in the contract to be invoked. In addition, the transaction 1 also includes a GAS balance allocated to the transaction 1 and used for execution of the transaction 1. After reaching consensus on the transaction 1, each node of the blockchain can independently execute the designated smart contract to be invoked. The execution can be execution by the virtual machine of the node.

Figure 1:
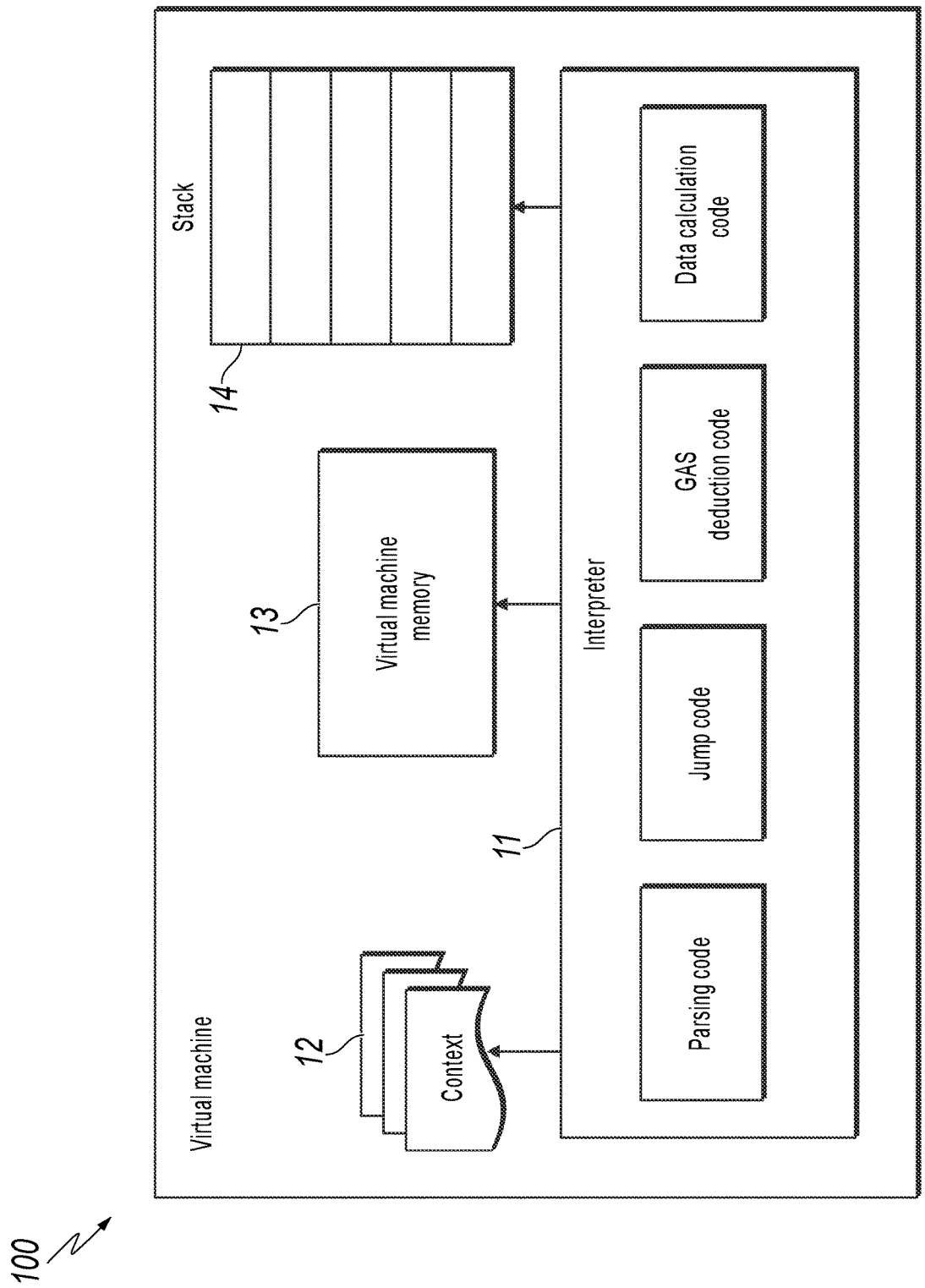
FIG. 1 is a schematic diagram illustrating a structure of a virtual machine 100.

FIG. 1 is a schematic diagram illustrating a structure of a virtual machine 100. As shown in FIG. 1, the virtual machine 100 includes an interpreter 11, a context 12, a virtual machine memory 13, and a stack 14. For example, the virtual machine 100 corresponds to the transaction 1, and when the transaction 1 is to be executed, the virtual machine 100 is run (that is, the virtual machine 100 is instantiated). The virtual machine 100 is essentially several parts of code to be executed, that is, parsing code, jump code, GAS deduction code, and data calculation code included in the interpreter 11. In addition, when the virtual machine 100 is run, certain storage space is allocated from the memory to the virtual machine 100, that is, the context 12, the virtual machine memory 13, and the stack 14. The context 12 is used to store the context information of the smart contract to be invoked in the transaction 1. The functions of the virtual machine memory 13 and the stack 14 are as follows:

When the transaction 1 is executed, the node can load bytecode (Bytecode) of the contract from the account storage into the virtual machine 100 based on the address of the contract in the transaction 1, and the node can further obtain, from the transaction 1, the GAS balance used to execute the transaction 1, and provide the GAS balance to the virtual machine 100. Then the interpreter 11 interprets and executes the smart contract. The interpretation and execution process includes: first, by executing the parsing code, parsing the bytecode of the contract to be invoked, to obtain machine code, storing the machine code in the virtual machine memory 13, and also obtaining the address of the function to be invoked; executing the GAS deduction code, calculating the amount of GAS that needs to be consumed for executing a predetermined instruction block of the contract, and determining whether the GAS balance allocated to transaction 1 is sufficient (that is, whether it is greater than or equal to the GAS that needs to be consumed); if the GAS balance is sufficient, performing GAS deduction, where the predetermined instruction block includes one or more instructions in the predetermined machine code; and after the deduction is completed, jumping to the corresponding address in the virtual machine memory 13 by executing the jump code to obtain the instruction in the predetermined block and starting to execute the instruction, calculating data operated by the instruction in the predetermined block by executing the data calculation code, and performing an operation of pushing/popping the stack 14, thereby completing data calculation. In this process, some context information of the contract such as a block number and information of the initiator of the contract to be invoked may also be needed. The interpreter 11 can obtain the information from the context 12. Finally, a generated state is stored in the account storage by invoking a storage interface.

It can be seen from the process of executing the transaction 1 that in the process of executing the transaction 1, the virtual machine 100 needs to perform GAS deduction before executing an instruction block of the smart contract each time, and then execute the instruction block after the deduction succeeds. In other words, in the process of executing the smart contract, the GAS deduction code needs to be executed a plurality of times, that is, the GAS deduction operation is a hot operation, and its execution efficiency greatly affects the execution efficiency of the smart contract. It can be understood that the entire execution process is performed by a processor in the node device, the machine code stored in the virtual machine memory 13 is also code that can be executed by the processor, and the code included in the interpreter 11 of the virtual machine is also code that can be executed by the processor. The processor can be a central processing unit (CPU) or a microprocessor, which is not limited.

Table 1 shows an instruction sequence corresponding to the transaction 1.

TABLE 1

| | |
|---|---|
| General purpose instruction 1 | 1d R2, 288 (a0) |
| General purpose instruction 2 | Addi R3, zero, 20 |
| General purpose instruction 3 | Bltu R2, R3, 54 |
| General purpose instruction 4 | addi R2, R2, −20 |
| General purpose instruction 5 | sd R2, 288 (a0) |
| Instructions in the instruction block 1 | {. . .} |

288 (a0) is an address obtained by adding 288 to an address of memory a0, a0 is a base address of the memory, R2 and R3 are register names in the processor, 288 is an offset of a storage location relative to a0, 288 is used for illustrative purposes only, and the offset is not limited to 288. Assume that after the virtual machine 100 obtains the GAS balance corresponding to the transaction 1, the GAS balance is stored in the memory address 288 (a0) in the virtual machine memory 13. In the process of parsing the smart contract in the transaction 1, the virtual machine 100 first determines that the GAS consumption of the instruction block 1 is 20 GAS before executing the instruction block 1 in the smart contract, so that the virtual machine 100 can generate, based on GAS calculation code, the general purpose instruction 1 to the general purpose instruction 5 shown in Table 1 as the GAS deduction code corresponding to the instruction block 1. The general purpose instruction 1 indicates that the GAS balance is to be read from the memory address 288 (a0) and stored in the general purpose register R2. The general purpose instruction 2 indicates that a sum of 0 and 20 is to be stored in the register R3, that is, 20 is to be stored in the register R3. The general purpose instruction 3 indicates that the values in the general purpose registers R2 and R3 are to be compared. If the value in the general purpose register R2 is less than the value in R3 (that is, 20), it points to memory 54, which is an end position of the program, the execution of the contract is terminated. If the value in the general purpose register R2 is greater than or equal to 20, execution of the instruction is continued. The general purpose instruction 4 indicates that the value in the general purpose register R2 is to be subtracted by 20 and then stored back to the general purpose register R2, that is, if the GAS balance is sufficient for deduction, the GAS deduction is performed. The general purpose instruction 5 indicates that the value in the general purpose register R2 is to be stored in the memory address 288 (a0), that is, the GAS balance in the memory address 288 (a0) will be updated.

Figure 2:
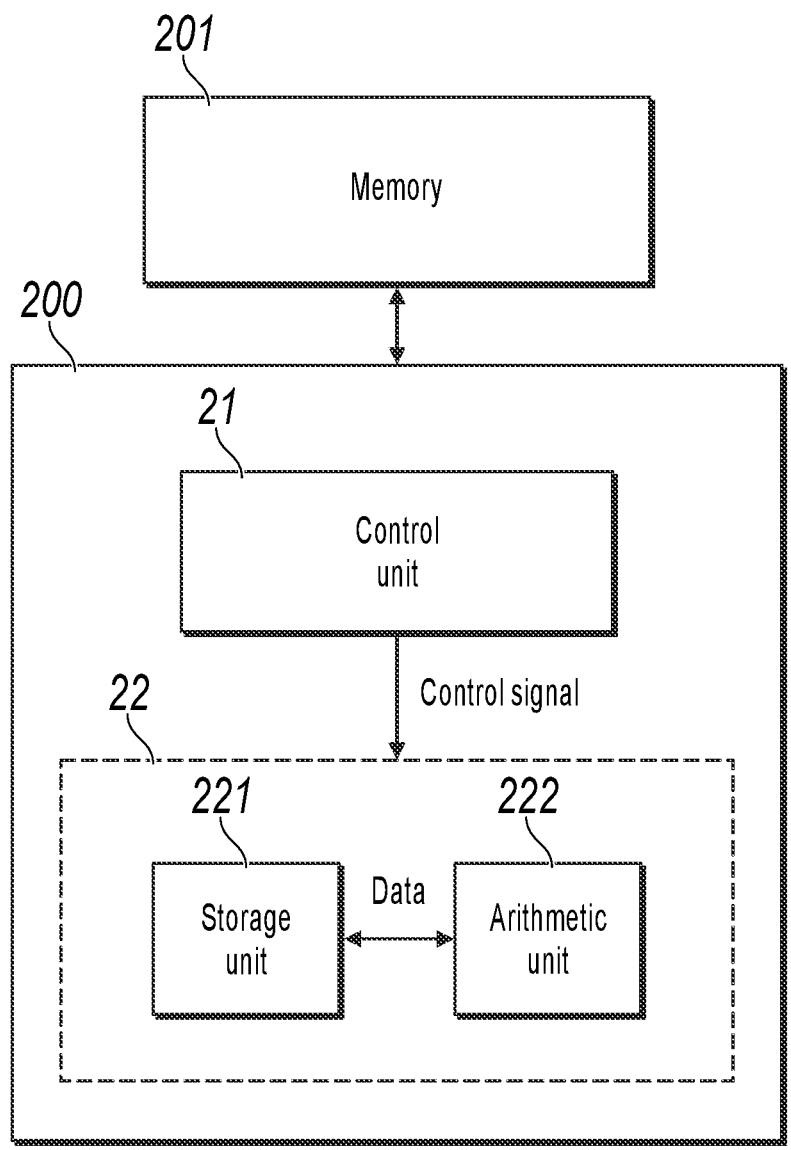
FIG. 2 illustrates a basic structure of a computing device.

Therefore, before executing the instruction block 1, the processor first executes the aforementioned general purpose instruction 1 to general purpose instruction 5 to perform the GAS deduction for the instruction block 1. FIG. 2 illustrates a basic structure of a computing device. As shown in FIG. 2, the computing device includes a processor 200 and a memory 201. The processor 200 is connected to the memory 201 by an external bus (shown by an arrow outside the processor 200 in FIG. 2), and configured to read data from the memory 201 or write data to the memory 201. It can be understood that in the computing device, the processor 200 is also connected by an external bus to a plurality of units, such as a permanent storage medium and various hardware devices, which are not shown in FIG. 2. The processor 200 includes a control unit 21 and an execution unit 22. The execution unit 22 includes a storage unit 221 and an arithmetic unit 222. An arrow inside the processor 200 in FIG. 2 represents an internal bus (for example, a 64-bit data bus). The control unit 21 sends a control signal to the execution unit 22 through the internal bus, and data is transmitted between the storage unit 221 and the arithmetic unit 222 through the internal bus. The control unit 21 is a command and control center of the processor 200, and includes an instruction register (IR), an instruction decoder (ID), an operation controller (OC), etc. The control unit 21 sequentially reads each instruction from the aforementioned virtual machine memory 13 and places the instruction in the instruction register, converts the instruction into a hardware digital signal as a control signal by using an instruction decoder, and sends the hardware control signal to the execution unit 22 based on a determined time sequence by using the operation controller, to instruct the execution unit 22 to perform an operation corresponding to the hardware control signal, where the hardware digital signal includes, for example, high and low signal levels on each bit data line in the 64-bit bus.

The storage unit 221 includes a CPU on-chip cache and a register set. The register set includes a plurality of general purpose registers and a plurality of special purpose registers. The registers are, for example, 64-bit registers. The arithmetic unit 222 is, for example, an ALU unit, which can perform arithmetic operations and logic operations. The execution unit 22 implements a plurality of logic circuits by connecting the storage unit 221 and the arithmetic unit 222, and the plurality of logic circuits correspond to a plurality of instructions in a predetermined instruction set of the processor 200, respectively. Therefore, the control unit 21 can instruct a specific logic circuit to operate operation data by sending a control signal corresponding to the specific logic circuit (including a data signal of the operation data) to the execution unit 22, thereby executing an instruction corresponding to the specific logic circuit.

When executing each instruction, the processor 200 needs to perform five stages, for example, instruction fetch (IF), instruction decode (ID), instruction execute (IE), memory access (MA), and write back (WB). IF refers to reading an instruction from the memory (here, the virtual machine memory 13), ID refers to interpreting the instruction into a digital signal, IE refers to performing an arithmetic or logic operation by using an arithmetic logic unit (ALU) in the processor, MA refers to accessing the memory to read or write data, and WB refers to writing an execution result of the instruction back to the register. Each stage usually needs one or two clock cycles. Therefore, the execution of the aforementioned general purpose instruction 1 to general purpose instruction 5 by the processor 200 will need more execution time.

In view of the aforementioned problems, in the embodiments of the present specification, an extended instruction specially used to perform deduction for a contract is designed for a processor, and a hardware structure of the processor is redesigned based on the extended instruction, so that the processor can perform deduction for the contract with higher efficiency.

Figure 3:
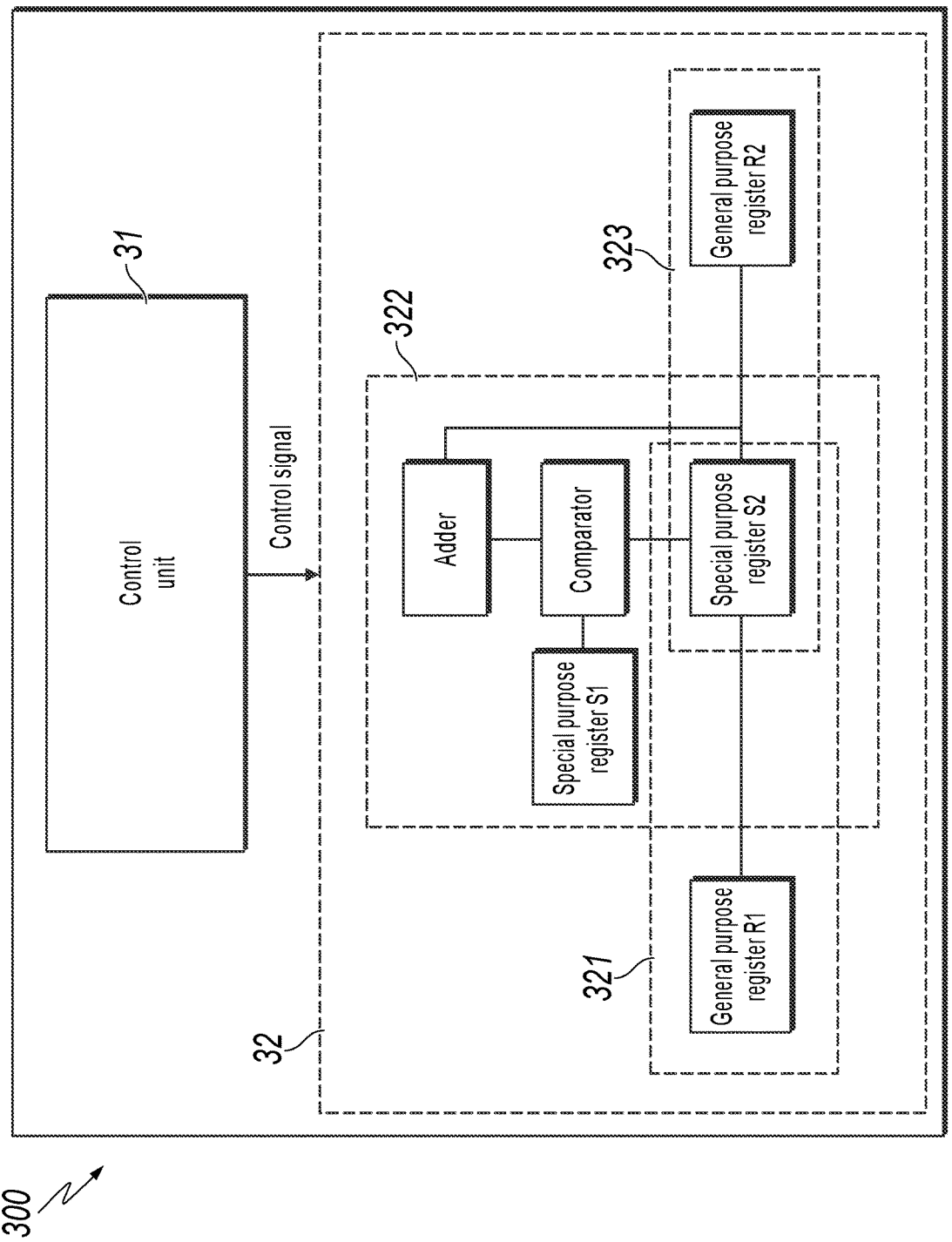
FIG. 3 is a schematic diagram illustrating a structure of a processor 300 according to some embodiments of the present specification.

FIG. 3 is a schematic diagram illustrating a structure of a processor 300 according to some embodiments of the present specification. As shown in FIG. 3, the processor 300 includes a control unit 31 and an execution unit 32. Compared with the execution unit 22, the execution unit 32 additionally includes a first logic circuit 321, a second logic circuit 322, and a third logic circuit 323. In the embodiments of the present specification, three extended instructions are newly designed for the processor 300: extended instruction 1, extended instruction 2, and extended instruction 3, which are used to perform deduction operations for a smart contract during execution of the contract. The first logic circuit 321, the second logic circuit 322, and the third logic circuit 323 correspond to the extended instruction 1, the extended instruction 2, and the extended instruction 3 respectively. Compared with the processor 200, the processor 300 further additionally includes a special purpose register S2. The special purpose register S2 is specially used to store a GAS balance corresponding to a transaction during execution of the transaction. A special purpose register S1 shown in FIG. 3 is a special purpose register for recording an execution status of the processor 300.

Table 2 shows an instruction sequence corresponding to a transaction 1 according to the embodiments of the present specification.

TABLE 2

| | |
|---|---|
| Extended instruction 1 | gas_set R1 |
| Extended instruction 2 | gas_dec 20 |
| All instructions in an instruction block 1 | {...} |
| Extended instruction 2 | gas_dec 30 |
| All instructions in an instruction block 2 | {...} |
| Extended instruction 3 | gas_get R2 |

Assume that the smart contract in the transaction 1 includes an instruction block 1 and an instruction block 2, and GAS consumption of the instruction block 1 is 20 GAS, and GAS consumption of the instruction block 2 is 30 GAS. Therefore, a virtual machine 100 can generate the instructions "gas_dec 20" and "gas_dec 30" in Table 2 based on GAS calculation code, where both the instructions "gas_dec 20" and "gas_dec 30" are extended instructions 2. The following describes an execution process of the instruction sequence shown in Table 2.

Specifically, before the transaction 1 is executed by the processor 300 according to the embodiments of the present specification, the virtual machine 100 can temporarily store the GAS balance in a general purpose register R1 after obtaining the GAS balance used to execute the transaction 1. After starting to execute the transaction 1, the processor 300 first performs deduction for the first instruction block in the smart contract (for example, the instruction block 1). As shown in Table 2, the GAS calculation code corresponding to the instruction block 1 includes the extended instruction 1 (gas_set R1) and extended instruction 2 (gas_dec 20), where "gas_set" is operation code, and "R1" represents the general purpose register R1.

After fetching the extended instruction 1 (gas_set R1) from a virtual machine memory 13 by using the control unit 31, the processor 300 decodes the instruction "gas_set R1" by using the control unit 31, to generate a control signal corresponding to the instruction "gas_set R1", and sends the control signal to the execution unit 32. The execution unit 32 selects the first logic circuit 321 corresponding to the instruction "gas_set R1" based on the control signal, and sends the control signal to the first logic circuit 321. The first logic circuit 321 includes a general purpose register R1 and a special purpose register S2 connected to each other. The first logic circuit 321 reads a current GAS balance from the general purpose register R1 based on the control signal, and stores the GAS balance in the special purpose register S2. It can be understood that after the virtual machine obtains the GAS balance from the transaction 1, the GAS balance is not limited to be stored in the general purpose register R1, but can also be stored in other general purpose registers or stored in an address in the memory. Therefore, based on the location in which the virtual machine stores the GAS balance, the structure of the first logic circuit 321 changes accordingly. For example, if the virtual machine stores the GAS balance in the memory, the first logic circuit 321 needs to include only the special purpose register S2 connected to an external bus of the CPU.

The processor 300 fetches the extended instruction 2 (gas_dec 20) from the virtual machine memory 13 after executing the instruction "gas_set R1", where "gas_dec" is operation code, and "20" is an operand. After fetching the instruction gas_dec 20, the processor 300 similarly decodes the instruction gas_dec 20 by using the control unit 31, sends a control signal obtained through decoding to the execution unit 32 to select the second logic circuit 322 corresponding to the instruction gas_dec 20, and sends the instruction to the second logic circuit 322. The second logic circuit 322 includes the special purpose register S2, the special purpose register S1, a comparator, and an adder connected as shown in FIG. 3. After the second logic circuit 322 receives the control signal corresponding to the instruction gas_dec 20, the second logic circuit 322 reads the GAS balance from the special purpose register S2 by using the comparator, compares whether the GAS balance is greater than or equal to 20 by using the comparator, and if the GAS balance is greater than or equal to 20, subtracts 20 from the GAS balance by using the adder and stores the GAS balance back into the special purpose register S2, and executes a next instruction (that is, the instruction in the instruction block 1). If the GAS balance is less than 20, a bit that is in the special purpose register S1 and corresponds to a state of GAS balance insufficiency is set to 1, and the execution of the instruction block 1 is terminated, so that the processor enters an abnormal state. In this case, the processor jumps to execute an exception handling function in the virtual machine 100. Therefore, by reading the special purpose register S1, the processor determines that the GAS balance corresponding to the transaction is insufficient, and returns a notification that the balance is insufficient.

If the GAS deduction for the instruction block 1 is successfully completed, the processor 300 executes all the instructions in the instruction block 1 sequentially. In other words, in the process of performing deduction for the instruction block 1 by the processor 300 in the embodiments of the present specification, only the extended instruction 1 and the extended instruction 2 need to be executed. In comparison with the aforementioned process of executing the general purpose instruction 1 to the general purpose instruction 5, clock cycles needed for the entire deduction process are greatly reduced, and the execution efficiency is improved.

After executing the instruction block 1 and before executing the instruction block 2 after the instruction block 1, the processor 300 executes the deduction code corresponding to the instruction block 2 based on the code sequence shown in Table 2. Because the GAS balance corresponding to the transaction 1 is already stored in the special purpose register S2, it is no longer necessary to execute the extended instruction 1 to store the GAS balance in the special purpose register S2. Therefore, the deduction code corresponding to the instruction block 2 includes only the extended instruction 2 (that is, gas_dec 30). In the process of performing deduction for the instruction block 2, the processor 300 needs to execute only one instruction to complete the deduction, thereby reducing the clock cycles needed for the deduction process and further improving execution efficiency of the contract.

After the transaction 1 is executed, the processor 300 also fetches the extended instruction 3 from the virtual machine memory 13, that is, the instruction gas_get R2 in Table 2, where "gas_get" is operation code, and "R2" represents a general purpose register R2. After decoding the extended instruction 3, the control unit 31 sends a control signal obtained through decoding to the execution unit 32, so that the execution unit 32 selects the third logic circuit 323 corresponding to the extended instruction 3, and sends the control signal to the third logic circuit 323. The third logic circuit 323 includes the special purpose register S2 and the general purpose register R2 connected to each other. After receiving the control signal, the third logic circuit 323 reads the current GAS balance from the special purpose register S2, and stores the GAS balance in the general purpose register R2. Therefore, the virtual machine 100 can obtain the GAS balance by reading the general purpose register R2, and update, based on the GAS balance, a status of an account that sends the transaction 1 in an account storage.

It can be understood that although the extended instruction 2 in Table 2 is executed before the instruction block of the smart contract is executed as described above, the embodiments of the present specification are not limited to this. For example, a deduction rule of deduction after execution can be predetermined in the virtual machine, so that the corresponding extended instruction 2 can be executed after the predetermined instruction block is executed, or each extended instruction 2 corresponding to each instruction block can be executed after the smart contract is executed.

Figure 4:
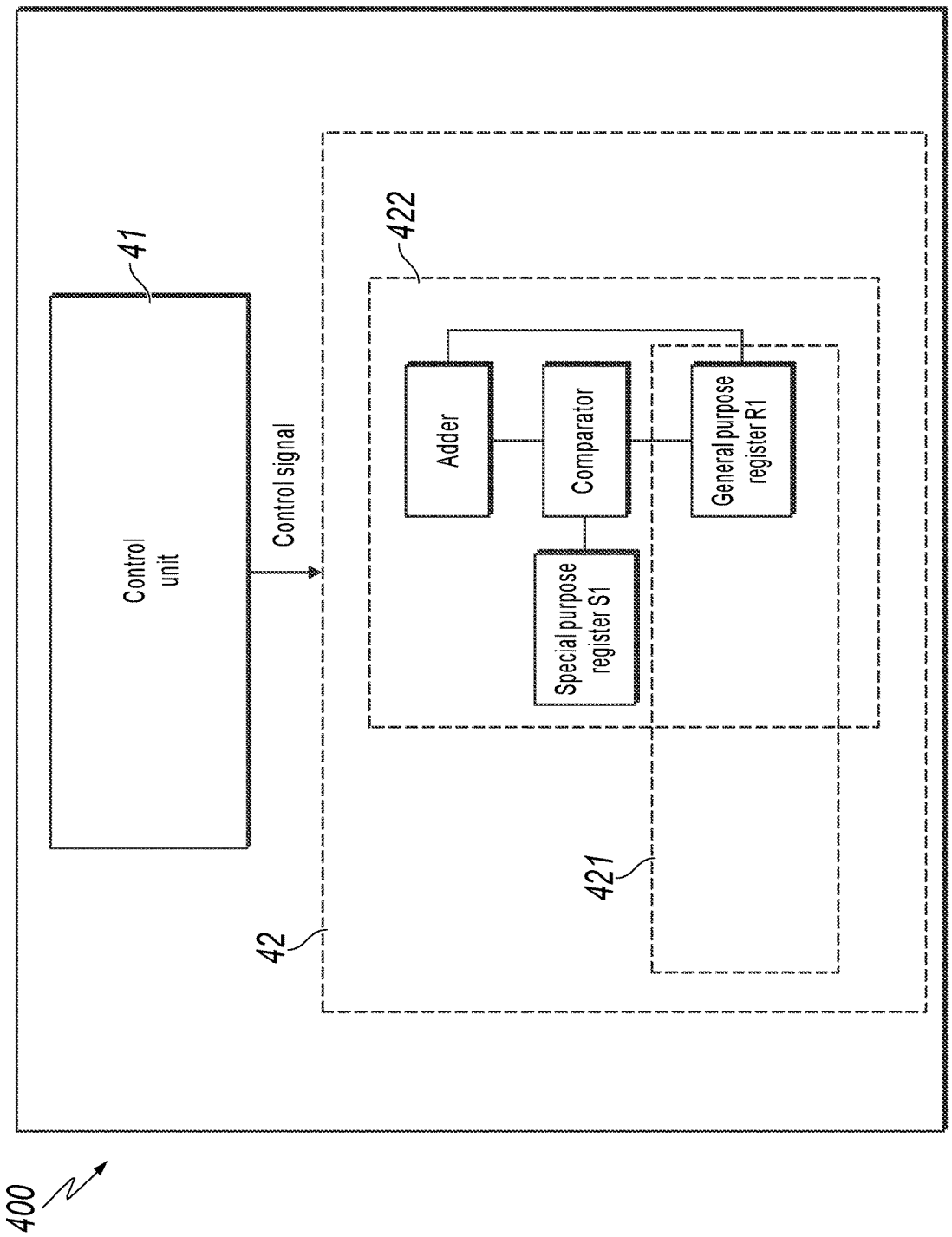
FIG. 4 is a schematic diagram illustrating a structure of a processor 400 according to other embodiments of the present specification.

FIG. 4 is a schematic diagram illustrating a structure of a processor 400 according to other embodiments of the present specification. As shown in FIG. 4, the processor 400 includes a control unit 41 and an execution unit 42. The execution unit 42 includes a fourth logic circuit 421 and a fifth logic circuit 422. In comparison with the aforementioned execution unit 22, the execution unit 42 additionally includes the fifth logic circuit 422. In the embodiments of the present specification, a new extended instruction, that is, an extended instruction 4, is added to the processor 400, and is used to perform a deduction operation for a smart contract during execution of the contract. The fifth logic circuit 422 corresponds to the extended instruction 4.

Table 3 shows an instruction sequence corresponding to a transaction 1 according to other embodiments of the present specification.

TABLE 3

| General purpose instruction 1 | ID R1, 288 (a0) |
| Extended instruction 4 | gas_dec R1, 20 |
| General purpose instruction 5 | Sd R1, 288 (a0) |
| All instructions in an instruction block 1 | {. . .} |

The following describes an execution process of the instruction sequence shown in Table 3.

Specifically, before the transaction 1 is executed by the processor 400 according to the embodiments of the present specification, after obtaining a GAS balance used to execute the transaction 1, a virtual machine 100 can store the GAS balance in a memory address designated for storing the GAS balance (that is, in 288 (a0)). After starting to execute the transaction 1, the processor 400 first performs deduction for a first instruction block in the smart contract (for example, the aforementioned instruction block 1). As shown in Table 3, GAS calculation code corresponding to the instruction block 1 includes the general purpose instruction 1, the extended instruction 4, and the general purpose instruction 5.

After fetching the general purpose instruction 1 (ld R1, 288 (a0)) from a virtual machine memory 13 by using the control unit 41, the processor 400 decodes the instruction "ld R1, 288 (a0)" by using the control unit 41, to generate a control signal corresponding to the instruction "ld R1, 288 (a0)", and sends the control signal to the execution unit 42. The execution unit 42 selects the fourth logic circuit 421 corresponding to the instruction "ld R1, 288 (a0)" based on the control signal. The fourth logic circuit 421 includes a general purpose register R1 connected to an external bus. Therefore, after receiving the control signal, the fourth logic circuit 421 reads a current GAS balance from the memory address 288 (a0), and stores the GAS balance in the general purpose register R1. It can be understood that after the virtual machine obtains the GAS balance from the transaction 1, the GAS balance is not limited to be stored in the memory address, but can also be stored in other general purpose registers. Therefore, according to a location in which the virtual machine stores the GAS balance, the structure of the fourth logic circuit 421 changes accordingly. For example, if the virtual machine stores the GAS balance in a general purpose register R2, the fourth logic circuit 421 includes the general purpose register R1 and the general purpose register R2 that are connected to each other.

The processor 400 fetches the extended instruction 4 (gas_dec R1, 20) from the virtual machine memory 13 after executing the instruction "ld R1, 288 (a0)", where "gas_dec" is operation code, R1 refers to the general purpose register R1, and "20" is an operand. After fetching the instruction gas_dec R1, 20, similarly the processor 400 decodes the instruction gas_dec R1, 20 by using the control unit 41, and sends a control signal obtained through decoding to the execution unit 42 to indicate that the fifth logic circuit 422 corresponding to the extended instruction 4 is to be selected. The fifth logic circuit 422 includes the general purpose register R1, a special purpose register S1, a comparator, and an adder connected as shown in FIG. 4. After the fifth logic circuit 422 receives the control signal, the fifth logic circuit 422 reads the GAS balance from the general purpose register R1 by using the comparator, compares whether the GAS balance is greater than or equal to 20 by using the comparator, and if the GAS balance is greater than or equal to 20, subtracts 20 from the GAS balance by using the adder and stores the GAS balance back into the general purpose register R1, and executes a next instruction. If the GAS balance is less than 20, a bit that is in the special purpose register S1 and corresponds to a state of GAS balance insufficiency is set to 1, and the execution of the instruction is terminated, so that the processor enters an abnormal state. In this case, the processor jumps to execute an exception handling function in the virtual machine 100. Therefore, by reading the special purpose register S1, the processor determines that the GAS balance corresponding to the transaction is insufficient, and returns a notification that the balance is insufficient.

If the GAS deduction for the instruction block 1 is successfully completed, the processor 400 fetches the general purpose instruction 5, that is, Sd R1, 288 (a0). After decoding the instruction Sd R1, 288 (a0), the control unit 41 sends a control signal obtained through decoding to the execution unit 42, so that the execution unit 42 selects the fourth logic circuit 421 corresponding to the instruction Sd R1, 288 (a0). After receiving the control signal, the fourth logic circuit 421 reads the current GAS balance from the general purpose register R1, and stores the GAS balance in the memory address 288 (a0). In other words, in the instruction sequence shown in Table 3, the general purpose instruction 1 and the general purpose instruction 5 correspond to the same fourth logic circuit 421, and cause the fourth logic circuit 421 to perform different operations. After that, the processor 400 executes all the instructions in the instruction block 1 sequentially. In the process of performing deduction for the instruction block 1 by using the processor 400 in the embodiments of the present specification, only three instructions shown in Table 3 need to be executed. In comparison with the aforementioned process of executing the general purpose instruction 1 to the general purpose instruction 5, clock cycles needed for the entire deduction process are greatly reduced, and the execution efficiency is improved.

Figure 5:
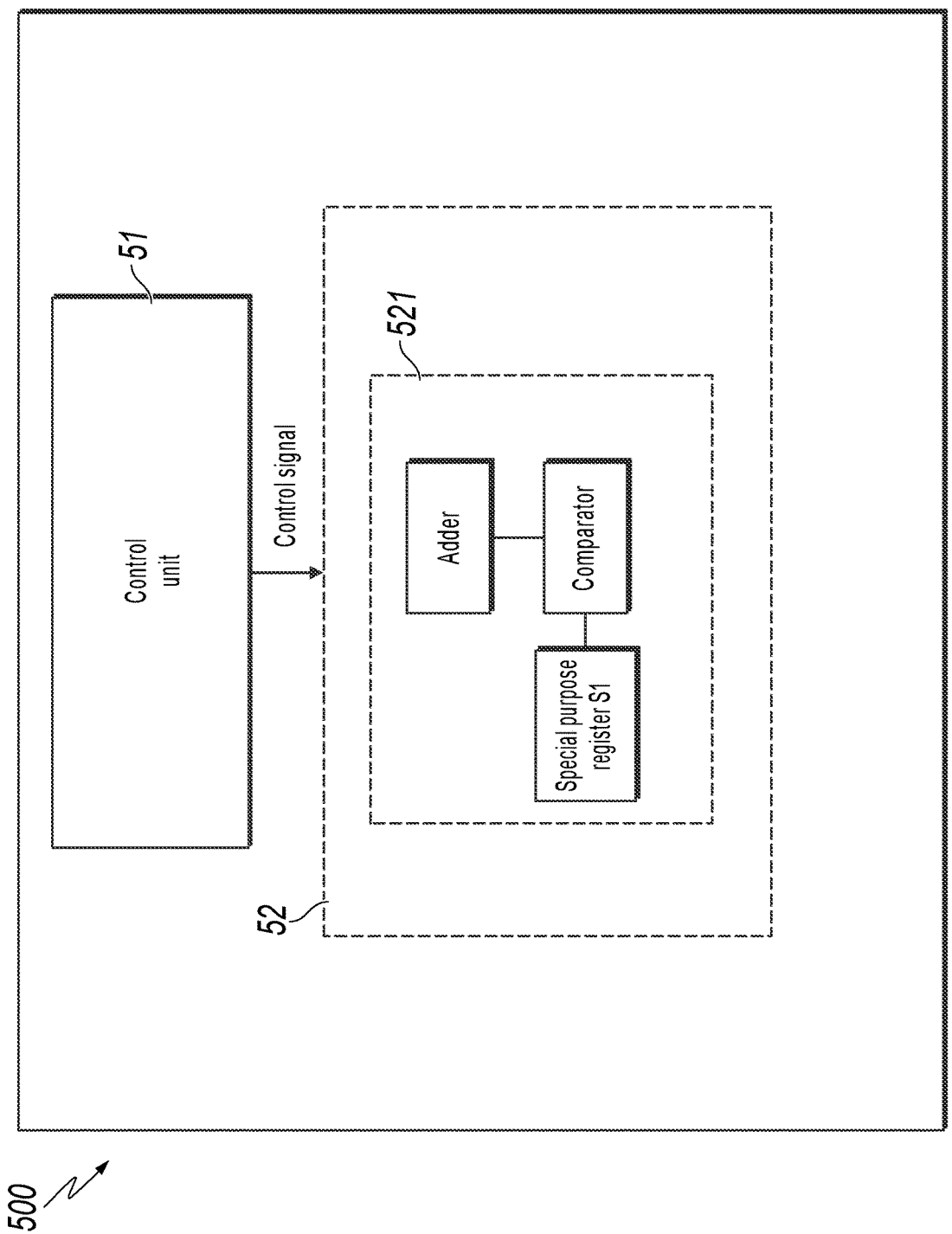
FIG. 5 is a schematic diagram illustrating a structure of a processor 500 according to other embodiments of the present specification.

FIG. 5 is a schematic diagram illustrating a structure of a processor 500 according to other embodiments of the present specification. As shown in FIG. 5, the processor 500 includes a control unit 51 and an execution unit 52. The execution unit 52 includes a sixth logic circuit 521. In comparison with the aforementioned execution unit 22, the execution unit 52 additionally includes a sixth logic circuit 521. In the embodiments of the present specification, a new extended instruction, that is, an extended instruction 5, is added to the processor 500, and is used to perform a deduction operation for a smart contract during execution of the contract. The sixth logic circuit 521 corresponds to the extended instruction 5.

Table 4 shows an instruction sequence corresponding to a transaction 1 according to other embodiments of the present specification.

TABLE 4

| Extended instruction 5 | gas_dec 288 (a0), 20 |
|---|---|
| All instructions in an instruction block 1 | {. . .} |

The following describes an execution process of the instruction sequence shown in Table 4.

Specifically, before the transaction 1 is executed by the processor 500 according to the embodiments of the present specification, after obtaining a GAS balance used to execute the transaction 1, a virtual machine 100 can store the GAS balance in a memory address designated for storing the GAS balance (that is, in 288 (a0)). After starting to execute the transaction 1, the processor 500 first performs deduction for a first instruction block in the smart contract (for example, the aforementioned instruction block 1). As shown in Table 4, GAS calculation code corresponding to the instruction block 1 includes only the extended instruction 5.

After fetching the extended instruction 5 (gas_dec 288 (a0), 20) from a virtual machine memory 13 by using the control unit 51, the processor 500 decodes the instruction "gas_dec 288 (a0), 20" by using the control unit 51, to generate a control signal corresponding to the instruction, and sends the control signal to the execution unit 52. The execution unit 52 selects the sixth logic circuit 521 corresponding to the instruction "gas_dec 288 (a0), 20" based on the control signal. The sixth logic circuit 521 includes a special purpose register S1, a comparator, and an adder connected as shown in FIG. 5, and the comparator and the adder in the sixth logic circuit 521 are also connected to the memory by an external bus. After the sixth logic circuit 521 receives the control signal, the sixth logic circuit 521 reads the GAS balance from the memory address 288 (a0), compares whether the GAS balance is greater than or equal to 20 by using the comparator, and if the GAS balance is greater than or equal to 20, subtracts 20 from the GAS balance by using the adder and stores the GAS balance back into the memory address 288 (a0), and executes a next instruction (that is, an instruction in the instruction block 1). If the GAS balance is less than 20, a bit that is in the special purpose register S1 and corresponds to a state of GAS balance insufficiency is set to 1, and the execution of the instruction is terminated, so that the processor enters an abnormal state. In this case, the processor jumps to execute an exception handling function in the virtual machine 100. Therefore, by reading the special purpose register S1, the processor determines that the GAS balance corresponding to the transaction is insufficient, and returns a notification that the balance is insufficient. The processor 500 according to the embodiments can be, for example, a processor based on a CISC architecture or other processors capable of performing operations on data in the memory.

In other words, in the process of performing deduction for the instruction block 1 by the processor 500 in the embodiments of the present specification, only one instruction shown in Table 4 needs to be executed. In comparison with the aforementioned process of executing the general purpose instruction 1 to the general purpose instruction 5, clock cycles needed for the entire deduction process are greatly reduced, and the execution efficiency is improved.

The embodiments of the specification further disclose a computing device, including any one of the previous processors. The computing device is used as a node device of a node on a blockchain. In the computing device, an operating system (for example, a kernel (Kernel) of a Linux system) is also modified accordingly to adapt to the processor according to the embodiments of the present specification. For example, the computing device processes a transaction 1 and a transaction 2 concurrently. For example, the aforementioned processor 300 can process the transaction 1 and the transaction 2 by using threads T1 and T2 respectively. When the thread T1 processes the transaction 1, the special purpose register S2 stores the GAS balance for executing the transaction 1. When the thread 2 processes the transaction 2, the balance corresponding to the transaction 1 in the special purpose register S2 is stored in another storage unit (such as a memory, a register, or a cache) through kernel scheduling, and the GAS balance corresponding to the transaction 2 is stored in the special purpose register S2.

According to the smart contract execution solutions in the embodiments of the present specification, the instruction set is extended, so that the function of deduction that is originally implemented by multiple instructions can be implemented by relatively fewer extended instructions instead. The execution cycles of the original plurality of instructions are reduced to fewer clock cycles, thereby improving the execution efficiency of the virtual machine.

It should be understood that the descriptions of "first", "second", etc. in the present specification are merely used to distinguish between similar concepts for simplicity of description, and do not have other limiting effects.

The embodiments of the present specification are described in a progressive way. For same or similar parts of the embodiments, mutual references can be made. Each embodiment focuses on a difference from other embodiments. Particularly, a system embodiment is similar to a method embodiment, and therefore is described briefly. For related parts, references can be made to related descriptions in the method embodiment.

Specific embodiments of the present specification are described above. Other embodiments fall within the scope of the appended claims. In some situations, the actions or steps described in the claims can be implemented in an order different from the order in the embodiments and the desired results can still be achieved. In addition, the process depicted in the accompanying drawings does not necessarily need a particular order or successive order to achieve the desired results. In some implementations, multi-tasking and concurrent processing are feasible or may be advantageous.

A person of ordinary skill in the art should also realize that units and algorithmic steps in examples described the embodiments disclosed here can be implemented by electronic hardware, computer software, or a combination of electronic hardware and computer software. To clearly describe the interchangeability of the hardware and software, the components and steps in the examples have been described in general in the present specification according to functionality. Whether the functions are performed by hardware or software depends on particular applications and design constraints of the technical solutions. A person of ordinary skill in the art can use different methods to implement the described functions for each particular application, but it should not be considered that the implementation goes beyond the scope of the present application. The software module can be placed in a random access memory (RAM), a memory, a read-only memory (ROM), an electrically programmable ROM, an electrically erasable programmable ROM, a register, a hard disk, a removable disk, a CD-ROM, or a storage medium in any other form known in the art.

In the aforementioned specific implementations, the objective, technical solutions, and beneficial effects of the present invention are further described in detail. It should be understood that the aforementioned descriptions are merely specific implementations of the present invention, but are not intended to limit the protection scope of the present invention. Any modification, equivalent replacement, or improvement made without departing from the spirit and principle of the present invention shall fall within the protection scope of the present invention.

What is claimed is:

1. A processor comprising a first logic circuit and a second logic circuit, wherein the first logic circuit comprises a special purpose register that is used to store resource balances corresponding to transactions during executions of the transactions, a comparator, and an adder, wherein the special purpose register stores a first resource balance for executing a smart contract, wherein the second logic circuit comprises a first general purpose register and the special purpose register, and wherein the processor performs one or more operations comprising:
   storing, before the smart contract is executed, the first resource balance in the first general purpose register;
   receiving, by the first logic circuit, a first digital signal, wherein the first digital signal comprises a resource deduction quota corresponding to a code set in the smart contract;
   reading, by the first logic circuit, the first resource balance from the special purpose register;
   comparing, by the first logic circuit and using the comparator, the first resource balance with the resource deduction quota;
   in response to the first resource balance being greater than or equal to the resource deduction quota, subtracting, by the first logic circuit and using the adder, the resource deduction quota from the first resource balance to obtain a second resource balance; and
   storing, by the first logic circuit, the second resource balance in the special purpose register.

2. The processor of claim 1, and wherein the one or more operations comprises:
   receiving, by the second logic circuit, a second digital signal, wherein the second digital signal comprises an identifier of the first general purpose register;
   reading, by the second logic circuit, the first resource balance from the first general purpose register; and
   storing, by the second logic circuit, the first resource balance in the special purpose register.

3. The processor of claim 2, the one or more operations comprising, before receiving the second digital signal:
   obtaining a second instruction from a virtual machine memory;
   decoding the second instruction to generate the second digital signal;
   selecting, based on the second instruction, the second logic circuit; and
   sending the second digital signal to the second logic circuit.

4. The processor of claim 1, wherein the processor further comprises a third logic circuit, wherein the third logic circuit comprises a second general purpose register and the special purpose register, and wherein the one or more operations comprises:
   receiving, by the third logic circuit, a third digital signal, wherein the third digital signal comprises an identifier of the second general purpose register;
   reading, by the third logic circuit, a fourth resource balance from the special purpose register; and
   storing, by the third logic circuit, the fourth resource balance in the second general purpose register.

5. The processor of claim 1, wherein the processor further comprises a status register, and wherein the one or more operations comprises:
   in response to the first resource balance being less than the resource deduction quota, terminating execution of the smart contract; and
   recording a state of balance insufficiency in the status register.

6. The processor of claim 1, the one or more operations comprising:
   after storing the second resource balance in the special purpose register, executing the code set in the smart contract.

7. The processor of claim 1, the one or more operations comprising, before receiving the first digital signal:
   obtaining a first instruction from a virtual machine memory;
   decoding the first instruction to generate the first digital signal;
   selecting, based on the first instruction, the first logic circuit; and
   sending the first digital signal to the first logic circuit.

8. A computer-implemented method comprising:
   storing, before a smart contract is executed, a first resource balance in a first general purpose register;
   receiving, by a first logic circuit comprised in a processor, a first digital signal, wherein the first logic circuit comprises a special purpose register, a comparator, and an adder, wherein the special purpose register stores the first resource balance for executing the smart contract, wherein the first digital signal comprises a resource deduction quota corresponding to a code set in the smart contract, wherein the special purpose register is used to store resource balances corresponding to transactions during executions of the transactions, wherein the processor further comprises a second logic circuit, and wherein the second logic circuit comprises the first general purpose register and the special purpose register;
   reading, by the first logic circuit, the first resource balance from the special purpose register;
   comparing, by the first logic circuit and using the comparator, the first resource balance with the resource deduction quota;
   in response to the first resource balance being greater than or equal to the resource deduction quota, subtracting, by the first logic circuit and using the adder, the resource deduction quota from the first resource balance to obtain a second resource balance; and
   storing, by the first logic circuit, the second resource balance in the special purpose register.

9. The computer-implemented method of claim 8, and wherein the computer-implemented method comprises:
   receiving, by the second logic circuit, a second digital signal, wherein the second digital signal comprises an identifier of the first general purpose register;
   reading, by the second logic circuit, the first resource balance from the first general purpose register; and
   storing, by the second logic circuit, the first resource balance in the special purpose register.

10. The computer-implemented method of claim 9, the computer-implemented method comprising, before receiving the second digital signal:
   obtaining a second instruction from a virtual machine memory;
   decoding the second instruction to generate the second digital signal;
   selecting, based on the second instruction, the second logic circuit; and
   sending the second digital signal to the second logic circuit.

11. The computer-implemented method of claim 8, wherein the processor further comprises a third logic circuit, wherein the third logic circuit comprises a second general purpose register and the special purpose register, and wherein the computer-implemented method comprises:
   receiving, by the third logic circuit, a third digital signal, wherein the third digital signal comprises an identifier of the second general purpose register;
   reading, by the third logic circuit, a fourth resource balance from the special purpose register; and
   storing, by the third logic circuit, the fourth resource balance in the second general purpose register.

12. The computer-implemented method of claim 8, wherein the processor further comprises a status register, and wherein the computer-implemented method comprises:
   in response to the first resource balance being less than the resource deduction quota, terminating execution of the smart contract; and
   recording a state of balance insufficiency in the status register.

13. The computer-implemented method of claim 8, the computer-implemented method comprising:
   after storing the second resource balance in the special purpose register, executing the code set in the smart contract.

14. The computer-implemented method of claim 8, the computer-implemented method comprising, before receiving the first digital signal:
   obtaining a first instruction from a virtual machine memory;
   decoding the first instruction to generate the first digital signal;
   selecting, based on the first instruction, the first logic circuit; and
   sending the first digital signal to the first logic circuit.

15. A computer-implemented system, comprising:
   one or more computers; and
   one or more computer memory devices coupled with the one or more computers and having tangible, non-transitory, machine-readable media storing one or more instructions that, when executed by the one or more computers, perform one or more operations comprising:
      storing, before a smart contract is executed, a first resource balance in a first general purpose register;
      receiving, by a first logic circuit comprised in a processor, a first digital signal, wherein the first logic circuit comprises a special purpose register, a comparator, and an adder, wherein the special purpose register stores the first resource balance for executing the smart contract, wherein the first digital signal comprises a resource deduction quota corresponding to a code set in the smart contract, wherein the special purpose register is used to store resource balances corresponding to transactions during executions of the transactions, wherein the processor further comprises a second logic circuit, and wherein the second logic circuit comprises the first general purpose register and the special purpose register;
      reading, by the first logic circuit, the first resource balance from the special purpose register;
      comparing, by the first logic circuit and using the comparator, the first resource balance with the resource deduction quota;
      in response to the first resource balance being greater than or equal to the resource deduction quota, subtracting, by the first logic circuit and using the adder, the resource deduction quota from the first resource balance to obtain a second resource balance; and
      storing, by the first logic circuit, the second resource balance in the special purpose register.

16. The computer-implemented system of claim 15, wherein the operations comprise:
   receiving, by the second logic circuit, a second digital signal, wherein the second digital signal comprises an identifier of the first general purpose register;
   reading, by the second logic circuit, the first resource balance from the first general purpose register; and
   storing, by the second logic circuit, the first resource balance in the special purpose register.

17. The computer-implemented system of claim 16, the operations comprising, before receiving the second digital signal:
   obtaining a second instruction from a virtual machine memory;
   decoding the second instruction to generate the second digital signal;
   selecting, based on the second instruction, the second logic circuit; and
   sending the second digital signal to the second logic circuit.

18. The computer-implemented system of claim 15, wherein the processor further comprises a third logic circuit, wherein the third logic circuit comprises a second general purpose register and the special purpose register, and wherein the operations comprise:
   receiving, by the third logic circuit, a third digital signal, wherein the third digital signal comprises an identifier of the second general purpose register;
   reading, by the third logic circuit, a fourth resource balance from the special purpose register; and
   storing, by the third logic circuit, the fourth resource balance in the second general purpose register.

19. The computer-implemented system of claim 15, wherein the processor further comprises a status register, and wherein the operations comprise:
   in response to the first resource balance being less than the resource deduction quota, terminating execution of the smart contract; and
   recording a state of balance insufficiency in the status register.

20. The computer-implemented system of claim 15, the operations comprising:
   after storing the second resource balance in the special purpose register, executing the code set in the smart contract.

* * * * *

UNITED STATES PATENT AND TRADEMARK OFFICE
CERTIFICATE OF CORRECTION

PATENT NO. : 11,327,756 B2
APPLICATION NO. : 17/362855
DATED : May 10, 2022
INVENTOR(S) : Xuepeng Guo et al.

It is certified that error appears in the above-identified patent and that said Letters Patent is hereby corrected as shown below:

In the Claims

Column 15, Line 44, in Claim 2, delete "and wherein" and insert -- wherein --.

Column 16, Line 59-60, in Claim 9, delete "and wherein" and insert -- wherein --.

Signed and Sealed this
Twenty-third Day of August, 2022

Katherine Kelly Vidal
*Director of the United States Patent and Trademark Office*